(12) United States Patent
Wang et al.

(10) Patent No.: US 9,762,422 B2
(45) Date of Patent: Sep. 12, 2017

(54) TONE-PHASE-SHIFT KEYING: A NEW MODULATION SCHEME FOR SC-FDMA

(71) Applicant: QUALCOMM Incorporated, San Diego, CA (US)

(72) Inventors: Xiao feng Wang, San Diego, CA (US); Junyi Li, Chester, NJ (US); Zhi-Zhong Yu, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/572,730

(22) Filed: Dec. 16, 2014

(65) Prior Publication Data

US 2016/0105300 A1   Apr. 14, 2016

Related U.S. Application Data

(60) Provisional application No. 62/062,132, filed on Oct. 9, 2014.

(51) Int. Cl.
*H04L 27/20* (2006.01)
*H04L 5/00* (2006.01)

(52) U.S. Cl.
CPC ...... *H04L 27/2007* (2013.01); *H04L 27/2003* (2013.01); *H04L 27/2057* (2013.01); *H04L 5/0005* (2013.01)

(58) Field of Classification Search
CPC ............. H04L 27/2003; H04L 27/2057; H04L 1/0041; H04L 1/0668
USPC ....................................................... 375/308
See application file for complete search history.

(56) References Cited

U.S. PATENT DOCUMENTS

| 5,659,578 A * | 8/1997 | Alamouti | H04L 1/0057 |
| | | | 375/261 |
| 8,477,593 B2 | 7/2013 | Wei et al. | |
| 8,665,803 B2 | 3/2014 | Sampath et al. | |
| 8,681,764 B2 | 3/2014 | Gore et al. | |
| 2006/0126592 A1* | 6/2006 | Hassan | H04L 27/28 |
| | | | 370/349 |
| 2007/0153924 A1* | 7/2007 | Ling | H04L 1/20 |
| | | | 375/260 |
| 2011/0064041 A1 | 3/2011 | Hooli et al. | |

(Continued)

FOREIGN PATENT DOCUMENTS

| EP | 0282298 A2 | 9/1988 |
| WO | 2007017827 A1 | 2/2007 |

OTHER PUBLICATIONS

International Search Report and Written Opinion—PCT/US2015/052423—ISA/EPO—dated Jan. 19, 2016.

(Continued)

*Primary Examiner* — Leila Malek
(74) *Attorney, Agent, or Firm* — Arent Fox, LLP (57) ABSTRACT

A method of wireless communication by a user equipment includes determining an allocation of a set of tones in a symbol for conveying data. The method further includes determining to use m-ary phase shift keying (MPSK) to modulate the data onto a subset of tones of the set of tones. The method further includes modulating the data onto the subset of tones based on a mapping, wherein the mapping maps pairs of data values with a largest Hamming distance from each other to pairs of constellation points with a maximum Euclidean distance from each other.

20 Claims, 9 Drawing Sheets

(56) References Cited

U.S. PATENT DOCUMENTS

| | | | | |
|---|---|---|---|---|
| 2011/0205994 A1* | 8/2011 | Han | ............... | H04L 1/0668 370/329 |
| 2014/0098743 A1* | 4/2014 | Sud | ............... | H04J 11/0036 370/328 |
| 2014/0169188 A1 | 6/2014 | Arambepola et al. | | |

OTHER PUBLICATIONS

Khalona R.A., et al., "On the Performance of a Hybrid Frequency and Phase Shift Keying Modulation Technique," IEEE Transactions on Communications, IEEE Service Center, Piscataway, NJ, USA, vol. 41, No. 5, May 1, 1993 (May 1, 1993), pp. 655-659, XP000392921, ISSN: 0090-6778. DOI:10.1109/26.225476.

Liu X., et al., "M-ary Pulse-Position Modulation and Frequency-Shift Keying with Additional Polarization/Phase Modulation for High-Sensitivity Optical Transmission", Optics Express, vol. 19, No. 26, Dec. 12, 2011 (Dec. 12, 2011), p. B868-B881, XP055114437, ISSN: 1094-4087, DOI: 10.1364/0E.19.00B868.

Qualcomm Incorated: "Narrow band OFDMA—Tone-Phase-Shift Keying Modulation," 3GPP Draft; GP-140842—Tone Phase Shift Keying, 3rd Generation Partnership Project (3GPP), Mobile Competence Centre; 650, Route Des Lucioles; F-06921 Sophia-Antipolis Cedex; France vol. TSG GERAN, no. San Francisco, USA; 20141117-20141121, Nov. 17, 2014 (Nov. 17, 2014).

* cited by examiner

TONE-PHASE-SHIFT KEYING: A NEW MODULATION SCHEME FOR SC-FDMA

CROSS-REFERENCE TO RELATED APPLICATION

This application claims the benefit of U.S. Provisional Application Ser. No. 62/062,132, entitled "TONE-PHASE-SHIFT KEYING: A NEW MODULATION SCHEME FOR SC-FDMA" and filed on Oct. 9, 2014 which is expressly incorporated by reference herein in its entirety.

BACKGROUND

Field

The present disclosure relates generally to wireless communication, and more particularly, to signal modulation.

Background

Orthogonal frequency-division multiplexing (OFDM) is a popular signal modulation scheme having various advantages. One such advantage is that OFDM readily supports flexible multiple-user access. OFDM and orthogonal frequency-division multiple access (OFDMA) are widely used in modern wireless communication systems such as Wireless Local Area Networking (WLAN), Long-Term Evolution (LTE), etc.

OFDM signals may have a relatively high peak-to-average power ratio (PAPR). High PAPR may lead to the necessity of high-resolution analog-to-digital converters (ADCs), high-resolution digital-to-analog converters (DACs), and power amplifiers having high linearity. Oftentimes, high-linearity power amplifiers have lower power efficiency, due to the amount of power needed to produce an effective signal, as well as higher cost. Although OFDM may be commonly used in downlink transmissions from a base station, such as an evolved Node B (eNB), the disadvantages of power and cost associated with OFDM can make OFDM poorly suited for mobile devices requiring reduced power consumption to maintain long battery life.

For reduced PAPR, single-carrier frequency-division multiple access (SC-FDMA) can be used. The reduced PAPR associated with SC-FDMA enables increased power efficiency when compared to OFDMA, making SC-FDMA suitable for transmissions from a mobile device/user equipment (UE), such as an uplink transmission of a UE operating according to the LTE standard of telecommunication. However, although SC-FDMA reduces PAPR when compared to conventional OFDMA, SC-FDMA still has a relatively large PAPR when a relatively large number of tones are allocated for the uplink transmission of the signal.

Much effort has been made to reduce signal PAPR of OFDM and SC-FDMA signals without significant success. Various schemes have been proposed that often entail complicated signal processing, loss in bandwidth efficiency, and/or increased inter-carrier interference. One example is the attempt to apply constant-envelope modulations, such as minimum-shift keying (MSK) and Gaussian MSK (GMSK), to SC-FDMA. Due to their nonlinearity, implementation of MSK and GMSK in SC-FDMA is not straightforward, and entails significant bandwidth expansion and loss in error performance. With the advent of internet of things (IOT), there is a growing need for very low-power wireless communication devices to enable extended battery life. This in turn calls for modulation schemes with very low PAPR.

SUMMARY

In an aspect of the disclosure, a method of wireless communication by a UE is provided. The UE determines an allocation of a set of tones in a symbol for conveying data. The UE determines to use m-ary phase shift keying (MPSK) to modulate the data onto a subset of tones of the set of tones. The UE modulates the data onto the subset of tones based on a mapping that maps pairs of data values with a largest Hamming distance from each other to pairs of constellation points with a maximum Euclidean distance from each other.

In an aspect of the disclosure, a method of wireless communication is provided. The method may be performed by a base station. The base station receives a data transmission from a user equipment (UE). The base station detects a subset of tones having maximal energy of an allocated set of tones in a symbol. The base station demodulates each tone of the subset of tones to determine data based on a mapping that maps pairs of data values with a largest Hamming distance from each other to pairs of constellation points with a maximum Euclidean distance from each other.

DETAILED DESCRIPTION

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Figure 1:
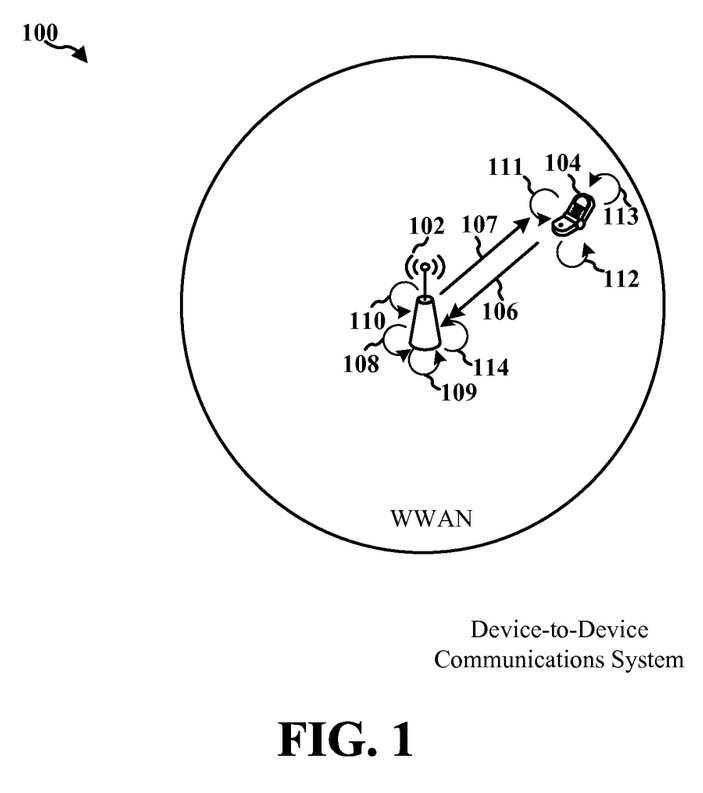
FIG. 1 is a diagram illustrating an example of an evolved Node B and a user equipment, and illustrating an exemplary method in relation to data modulation and transmission.

FIG. 1 is a diagram 100 illustrating an example of a base station 102 and a UE 104, and illustrating an exemplary method in relation to data modulation and transmission. Referring to FIG. 1, in a wireless communication method, such as WLAN, LTE, etc., a UE 104 may be allocated one or more resource elements that may be used to transmit data and/or control information, each resource element comprising a tone (in the frequency domain) in a symbol (in the time domain). As an example, the resource elements may be allocated to the UE 104 using a transmission 107 from a base station 102, such as an evolved Node B (eNB).

Once the UE 104 determines 111 which resource elements are allocated (e.g., which tones are allocated in a particular symbol), the UE 104 may select 112 one or more of the allocated resource elements, and may determine to modulate 113 data into the selected resource element(s). The manner in which the UE 104 selects 112 the resource elements and modulates 113 the data may correspond to an agreed upon modulation scheme, which in turn corresponds to an agreed upon mapping of allowed data values to allowed modulated values. Thereafter, the UE 104 may transmit a signal 106 including information (e.g., one or more modulated values) contained in one or more of the allocated resource elements. Then, the base station 102 may receive the signal 106, detect 108 which of the resource elements includes modulated values for indicating data from the UE 104, and may demodulate 109 the resource elements to determine the information of the signal 106 sent by the UE 104 (e.g., by comparing a received modulated value of a demodulated resource element to a closest matching allowed modulated value indicated in a constellation point set of the mapping known to the base station 102, and by then determining which data value corresponds to the closest matching allowed modulated value based on the mapping).

Configurations described below provide constant-envelope modulation schemes (e.g., 0 dB PAPR) that can be used in SC-FDMA signal generation. In general, configurations of the modulation schemes described below use a mapping to match modulated signals with data values (e.g., a constellation point index linking respective data values to various constellation points, or to one or more modulated values in one or more of a plurality of tones). A device seeking to transmit a signal containing a data value using the described modulation schemes (e.g., UE 104 seeking to transmit signal 106) might choose only a relatively small subset of allocated tones to transmit m-ary phase-shift keying (MPSK) signals according to values of bits of the data value to be transmitted. Accordingly, because the modulation schemes use both tone and signal phases to represent the data value, the modulation schemes may be referred to as tone-phase-shift keying (TPSK). Further, a TPSK modulation with D allocated tones and M allowed signal phases may be referred to as (D,M)-TPSK.

Figure 2:
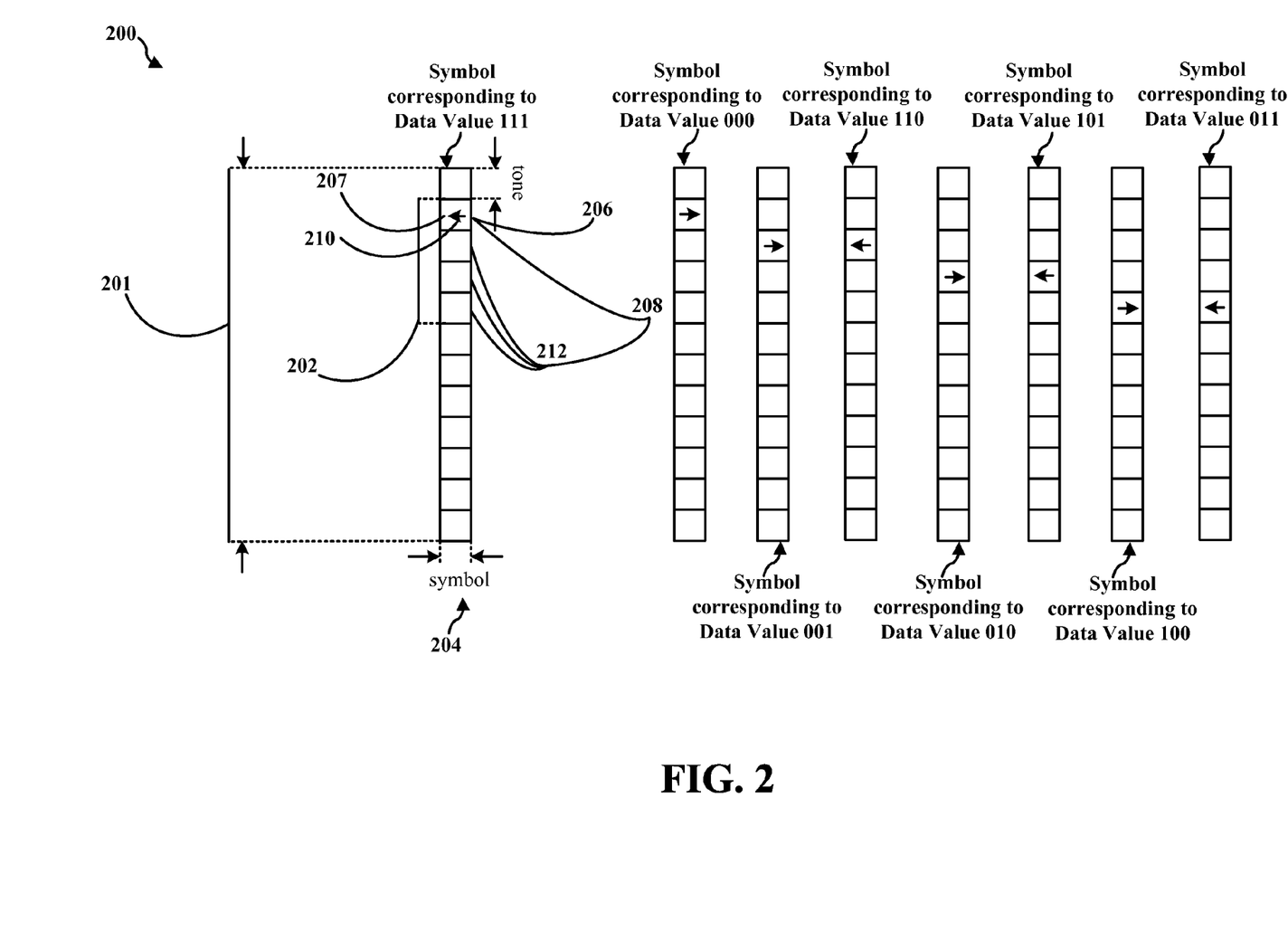
FIG. 2 is a diagram illustrating a first modulation scheme for modulating data into a selected tone from an allocated set of tones in a symbol.

FIG. 2 is a diagram 200 illustrating a first modulation scheme for modulating data as a modulated value 210 into a selected tone 207 of a selected subset 206 from an allocated set 202 of tones 201 in a symbol 204. In the present configuration, the UE 104 determines 111 which tones 208 are part of the allocated set 202, which phase-shift keying is used (e.g., Binary Phase-Shift Keying (BPSK) modulation, Quadrature Phase-Shift Keying (QPSK) modulation, 8PSK, etc.), and what bit-to-symbol mapping, or data-value-to-constellation-point mapping, is used to map a data value to a particular constellation point. Here, 4 tones are allocated, and BPSK is used (e.g., D is equal to 4 and M is equal to 2).

The UE 104 then selects 112 a subset 206 including only one tone 207 from an allocated set 202 of 4 tones of the 12 tones 201 in the symbol 204 for each data value intended. The UE 104 may then modulate 113 the tone 207 according to the determined mapping and corresponding to the data to be transmitted. That is, the data values to be transmitted by the UE 104 will determine which subset 206 of tones the UE 104 will select 112, and which modulated value 210 the UE will modulate onto the selected tone 207 of the subset 206 using the determined MPSK modulation. Thereafter, the UE 104 may transmit a signal 106 containing the modulated value 210 to the base station 102 to convey the data. The symbol 204 transmitted by the UE 104 may be the Inverse fast Fourier transform (IFFT) of a vector of data corresponding to a modulated value 210 with the entry of the tone 207 being the only nonzero entry of all tones 201 of the symbol 204.

Upon receiving the signal 106 from the UE 104, the base station 102 may determine 110 the data by demodulating 109 the received signal 106 to determine a corresponding modulated value 210 (e.g., to determine which signal phase is modulated, and on which tone 207), and by determining 114 which constellation point of the mapping corresponds to the determined modulated value 210.

When D tones 208 are allocated in the set 202 and M possible signal phases are allowed (e.g., M is equal to 2 for BPSK, M is equal to 4 for QPSK, M is equal to 8 for 8PSK, etc.), a constellation point corresponds to a signal phase of a modulated value 210 on the selected tone 207, while all other, unselected tones 212 of the allocated set 202 have zeroes thereon. Accordingly, the constellation point can be represented by a vector of length d having a single nonzero entry with a value of $\exp[j(2\pi/M+\phi)]$, where $j=\text{sqrt}(-1)$ and $\phi$ is any constant known the UE 104 and the base station 102.

Furthermore, because there is a total of M*D possible constellation points (e.g., the number of M possible constellation points per tone multiplied by D total tones is equal to D*M possible signals that may be transmitted), only $2^k$ allowed constellation points, or allowed modulated values, are chosen in a particular mapping, where k is the largest integer that is smaller than or equal to $\log_2(MD)$. That is, the number of bits of the data value to be transmitted 106 in symbol 204 is the largest integer that is not greater than $\log_2(M*D)$. Accordingly, for each OFDM or SC-FDMA symbol, a data sequence of k bits is mapped to one of $2^k$ d-length vectors, the entry of which is then sent over the allocated set 202 of tones.

Further still, an agreed upon mapping that maps each possible k-bit data sequence to each of the $2^k$ constellation points may be known to both the UE 104 and the base station 102 to enable communication using the described configuration. For example, mapping schemes may be determined with the intention of reducing or minimizing a bit error rate (BER), wherein pairs of bit sequences having a larger Hamming distance (i.e., a larger number of differing bits) are mapped to constellation points with a larger Euclidean distance.

For example, the present configuration uses BPSK across one of 4 tones such that there are 8 possible constellation points in a constellation set (i.e., M*D), thereby enabling 3 bits of data to be transmitted in each symbol (i.e., 0.75 bits per tone per symbol). Because four tones are allocated with only a single tone being a non-zero entry, and a constellation point may be denoted by [s1, s2, s3, s4] with s1 representing a modulated value of the signal on tone 1, s2 representing a modulated value of the signal on tone 2, etc. Further, in the present example, a modulated value of 1 corresponds to a vector of length d pointing to the right, while a modulated value of −1 corresponds to a vector of length d pointing to the left (e.g., modulated value 210). As shown in FIG. 2, data values 000 and 111 are respectively mapped to [1, 0, 0, 0] and [−1, 0, 0, 0], 001 and 110 are respectively mapped to [0, 1, 0, 0] and [0, −1, 0, 0], 010 and 101 are respectively mapped to [0, 0, 1, 0] and [0, 0, −1, 0], and 100 and 011 are respectively mapped to [0, 0, 0, 1] and [0, 0, 0, −1].

Because there are exactly 4 pairs of bit sequences that differ at 3 bits (e.g., 4 pairs of data, or bit sequences, that have a Hamming distance of 3), the mapping of the present configuration maps each of the pairs of data to two constellation points having a maximum Euclidean distance from each other. By matching pairs of data values having a largest Hamming distance with corresponding pairs of constellation points having a largest Euclidean distance, error rate is reduced, and bandwidth and power efficiency are improved over conventional phase-shift keying. It should be noted when two constellation points x and y among D selected tones are respectively represented by [x(1), x(2), ... x(D)] and [y(1), y(2), ... y(D)], then the Euclidean distance therebetween is represented by $\text{sqrt}\{[x(1)-y(1)]^2+[x(2)-y(2)]^2+ \ldots +[x(D)-y(D)]^2\}$. In comparison, the Euclidean distance between the two constellation points of conventional BPSK modulation may be represented by $d=2*\text{sqrt}(E_b)$, where $E_b$ is equal to an energy per bit, and wherein a BER is $0.5\ \text{erfc}[\text{sqrt}(E_b/No)]$.

To achieve improved bandwidth and power efficiency, D and M may be chosen such that they are not very large. It is also noteworthy that at high signal-to-noise ratio (SNR), a bit error rate of the (D,M)-TPSK can be approximated as $\alpha*\text{erfc}[d/(2\text{sqrt}(No))]$ with a being $\alpha$ constant depending on values corresponding to D and M, and depending on the mapping, wherein No is the noise variance, and d is the minimal Euclidean distance of the constellation.

Several TPSK schemes with good bandwidth and power efficiency, and additional examples of mapping schemes for different configurations, are provided below.

(1,2)-TPSK: When D is equal to 1 (i.e., only a single tone is allocated per symbol) and M is equal to 2 (e.g., BPSK), only one information bit can be transmitted per symbol. Such a configuration would be similar to conventional BPSK with only a single tone allocated.

(2,2)-TPSK: When D and M is each equal to 2, 2 bits of information can be carried in each symbol used by the UE to transmit data, or 1 bit per tone per symbol. The four constellation points (e.g., two constellation points per tone for two tones) may be represented by [0, +1], [0, −1], [+1, 0], [−1 0], where [0,+1] indicates that a phase-shift keying of 0 is transmitted over the first tone (e.g., an unselected tone) and a phase-shift keying of +1 is transmitted over the second tone. Similarly, [−1, 0] indicates that a phase-shift keying of −1 is transmitted over the first tone, and a keying of 0 is transmitted over the second tone. Such a configuration has the same bandwidth efficiency as BPSK, has a minimal Euclidean distance of $2*\text{sqrt}(E_b)$, where $E_b$ is the energy per bit, and has identical power efficiency (i.e., an equivalent BER for a given $E_b$) and bandwidth efficiency as BPSK.

(3,3)-TPSK: When D and M is each equal to 3, a data value having a 3-bit sequence can be carried per symbol (i.e., $\log_2(3*3)$ rounded down to the nearest integer is 3, therefore 3 bits per data value, or 1 bit per tone per symbol), which provides the same bandwidth efficiency as BPSK. However, the present scheme has a minimal Euclidean distance between two constellation points using different tones equal to $\text{sqrt}(6E_b)$, which is larger than that of BPSK, and therefore provides better power efficiency than BPSK at high SNR. Because an increased Euclidean distance of $3*\text{sqrt}(E_b)$ exists in the present scheme between any two constellation points using the same tone, two data values having a Hamming distance of 3 may be respectively mapped to two constellation points on the same tone. Accordingly, a possible mapping of the 8 constellation points respectively corresponding to the 8 data values 000 through 111 can be [0, 0, 1], [0, 1, 0], [1, 0, 0], [0, 0, $\exp(j2\pi/3)$], [0, $\exp(j2\pi/3)$, 0], [$\exp(j2\pi/3)$, 0, 0], [0, $\exp(j4\pi/3)$, 0], and [0, 0, $\exp(j4\pi/3)$]. As another example, the 8 constellation points corresponding to data values 000 to 111 can respectively be [0, 0, 1], [0, 0, $\exp(j2\pi/3)$], [0, 0, $\exp(j4\pi/3)$], [0, 1, 0], [0, $\exp(j2\pi/3)$, 0], [0, $\exp(j4\pi/3)$, 0], [1, 0, 0], [$\exp(j2\pi/3)$, 0, 0].

(4,4)-TPSK: When D and M is each equal to 4, the modulation scheme allows for 4 bits per symbol to be carried, which is the same bandwidth efficiency as that of BPSK. There are 8 pairs of bit sequences that differ at 4 bits (e.g., a Hamming distance of 4), such as the pair of bit sequences 0000 and 1111. Also, there are 8 pairs of constellation points with a maximal Euclidean distance, such as the pair [1, 0, 0, 0] and [−1, 0, 0, 0], and the pair [j, 0, 0, 0] and [j, 0, 0, 0]. The mapping in the present scheme may map each bit sequence pair having a maximal Hamming distance to a constellation pair with the maximal Euclidean distance. The minimal Euclidean distance of this scheme is d=sqrt ($8E_b$), resulting in a 3 dB gain in power efficiency when compared to conventional BPSK.

(4,8)-TPSK: When D is equal to 4, and M is equal to 8, the modulation scheme allows for 5 bits to be carried per symbol, or 1.25 bits to be carried per tone per symbol. There are 16 pairs of bit-sequences with a largest Hamming distance of 4, and 16 pairs of constellation points having a largest Euclidean distance of 2. A mapping scheme may map each of the 16 data pairs to one of the 16 constellation point pairs. The minimal Euclidean distance of such a (4,8)-TPSK modulation scheme is about sqrt($2.93E_b$), approximately resulting in a loss of 1.35 dB in power efficiency when compared to conventional BPSK at high SNR.

(6,6)-TPSK: When D and M are both equal to 6, the modulation scheme allows for 5 bits to be carried per symbol, or $5/6^{ths}$ of a bit per tone per symbol. A minimal Euclidean distance for the present scheme is sqrt($5E_b$), which provides a gain of 0.97 dB when compared to conventional BPSK.

(8,8)-TPSK: When D and M are both equal to 8, the modulation scheme allows for 6 bits to be carried per symbol or 0.75 bits per tone per symbol. The minimal Euclidean distance in the present scheme is sqrt($3.5E_b$), resulting in a loss of 0.58 dB when compared to conventional BPSK.

The TPSK modulation schemes described above can also be extended to more than one tone per symbol in other configurations, enabling better bandwidth efficiency, but also resulting in increased PAPR. For example, as will be described with respect to FIG. 3 below, instead of having a single tone containing a non-zero entry, two tones may be allowed to carry MPSK signals. In such a case, the PAPR is bounded by 3 dB, which is still substantially lower than conventional OFDMA and SC-OFDMA signals.

Figure 3:
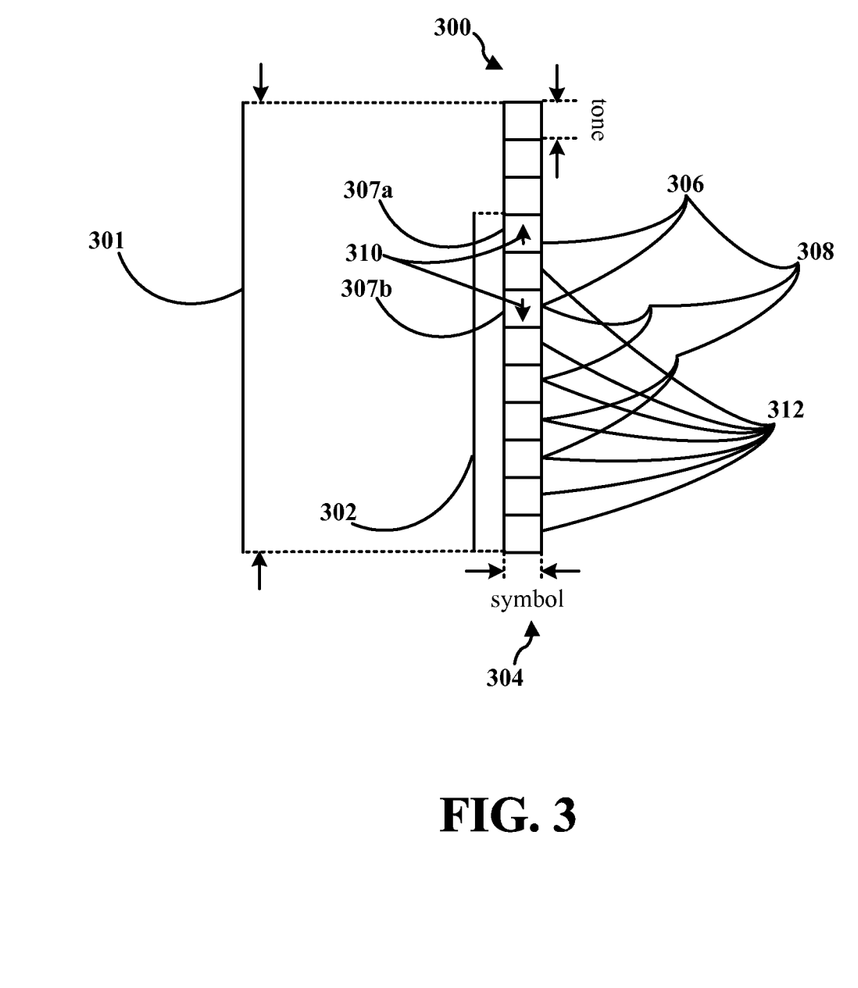
FIG. 3 is a diagram illustrating a second modulation scheme for modulating data into two tones of a selected two-tone subset from an allocated set of tones in a symbol.

FIG. 3 is a diagram 300 illustrating a second modulation scheme for modulating data into two tones 307a, 307b of a selected two-tone subset 306 from an allocated set 302 of tones 301 in a symbol 304. In the present configuration, and like the first configuration, tones of an allocated set 302 of tones 301 of a symbol 304 are allocated, a subset 306 of tones 307a, 307b is selected, and data is modulated into the selected subset 306. However, unlike the first configuration, the selected subset 306 includes two tones 307a, 307b instead of only one tone (i.e., tone 207). Further, the selected subset 306 (which may be selected 112 by the UE 104 according to information bits of an input data value, and according to a mapping) is one of a plurality of possible two-tone subsets (including subsets 308).

In the present configuration, when a set 302 of D tones are allocated, and when two tones are allowed to be used for each symbol 304, there are D*(D−1)/2 possible two-tone sets (e.g., each subset 308 comprising two tones). Within each two-tone set, there may be M*M distinct signal phase pairs (e.g., 16 distinct pairs of signal phases in QPSK). As a result, the number of bits that may be carried is equal to a largest integer that is not greater than log 2[D*(D−1)*M*M/2]. Furthermore, when log 2[D*(D−1)*M*M/2] is not an integer, it's possible to choose a particular subset of constellation points for reduced PAPR. For instance, if D was equal to 4 and M was equal to 5, 6 two-tone sets are possible, and a mapping including 128 allowed constellation points (of 150 possible constellation points) can be constructed to enable a data sequence of 7 bits to be carried per symbol time. The resulting scheme provides 40% more bandwidth efficiency when compared to standard BPSK. As another example, when D is equal to 8 and M is equal to 7, a constellation set of 1024 constellation points can be constructed to carry 10 bits per OFDM symbol. The resulting modulation scheme provides 25% higher bandwidth efficiency as compared to BPSK.

As described above, as many as all of the possible two-tone subsets of the D allocated tones may be used, which is equal to D*(D−1)/2. Alternatively, a number of allowed two-tone subsets may be limited such that a number of defined two-tone subsets may be equal to an integer power of 2. For example, if the number of tones in the allocated set 302 is represented by D, then the number of allowed two-tone subsets may be chosen as $D_c$, where $D_c$ is the largest integer of power 2 that is smaller than the number of possible different two-tone combinations of the tones of the allocated set 302. For example, if the number of tones in the allocated set is 8 (i.e., D is equal to 8), then 16 out of the 28 possible two-tone subsets may be set aside for the mapping scheme (i.e., $D_c$ is equal to 16).

Further, when only two tones are chosen for each symbol 304, the maximal PAPR is approximately 3 dB. At the receiver (e.g., the base station 102 shown in FIG. 1), an energy comparator may be applied to detect 108 tone(s) with the maximal energy (e.g., tones 307a and 307b) among the allocated set 302 of tones. Thereafter, the base station 102 may perform conventional MPSK demodulation 109 over the chosen tone(s) 307a, 307b of the selected subset 306 to determine modulated values on the tones. The error probability of tone selection at the receiver of the base station 102 (i.e., choosing an non-signal-bearing, unselected tone 312), may be represented by erfc(sqrt($E_s/(2*N_o)$))), where $E_s$ is the energy per MPSK signal, and where $N_o$ is the noise power spectral density.

Referring to the example shown in FIG. 3, the number of tones in the allocated set 302 is 9 (i.e., D is equal to 9). The number of possible two-tone combinations of the 9 different tones (i.e., D*(D−1)/2) is equal to 9*(9−1)/2, which is equal to 36. For ease of description, only three two-tone subsets 308 are shown in FIG. 3. After the subset 306 is selected, MPSK (e.g., QPSK) may be used to modulate the data corresponding to the modulated values 310 into the selected subset 306 according to a mapping. For each symbol 304, and according to the mapping, one of the two-tone subsets is chosen to transmit two chosen QPSK modulated values (e.g., signal phase j in tone 307a, and signal phase −j in tone 307b) in the transmitted signal 106.

Figure 4:
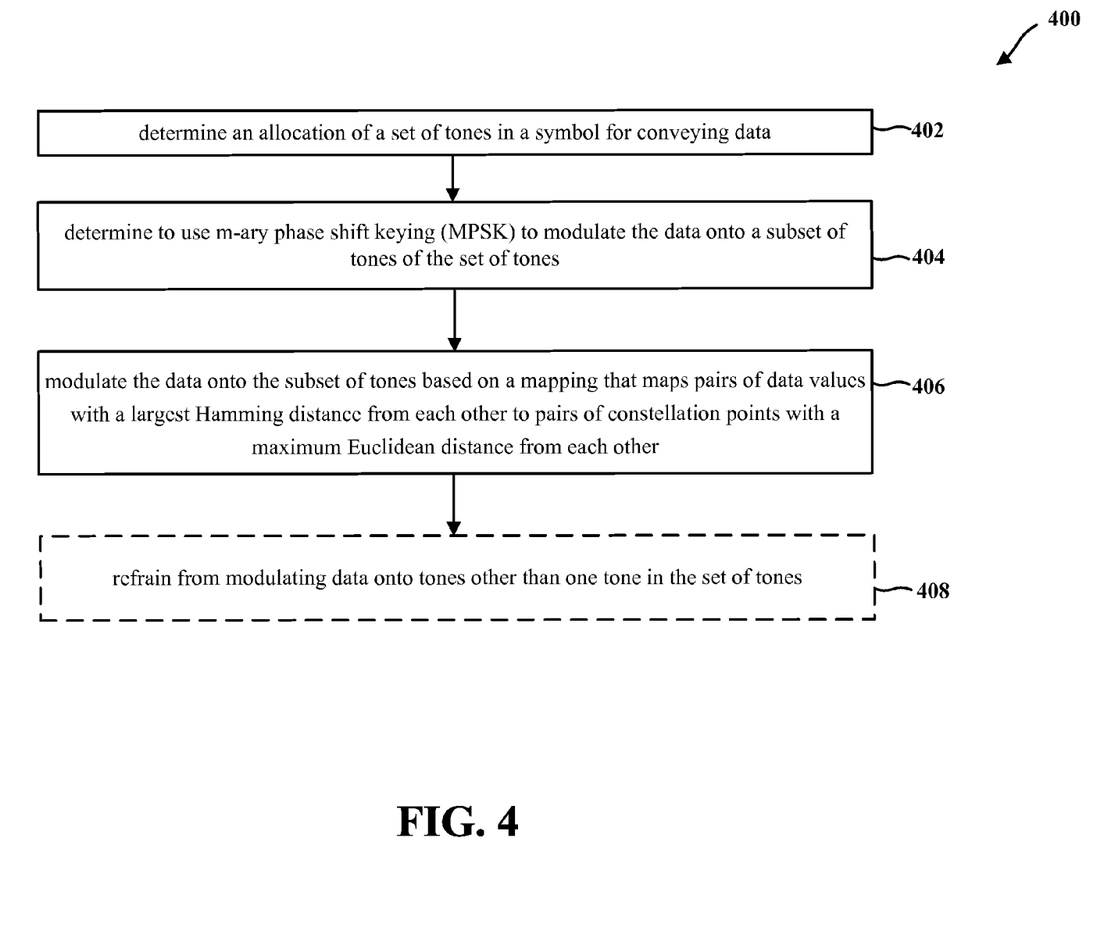
FIG. 4 is a flow chart of a method of wireless communication.

FIG. 4 is a flow chart 400 of a method of wireless communication by a UE. The method may be performed by a UE, such as the UE 104 shown in FIG. 1. At 402, an allocation of a set of tones in a symbol for conveying data is determined. The symbol may be a SC-FDMA symbol. For example, referring to FIGS. 1-3, the UE 104 may determine 111 an allocation of a set 202, 302 of tones 201, 301 in a SC-FDMA symbol 204, 304 for conveying data 210, 310.

At 404, a determination to use m-ary phase shift keying (MPSK) to modulate the data onto a subset of tones of the set of tones is made. In a first configuration, the subset of tones may include one tone, the set of tones includes D tones, the MPSK may have M possible signal phases, k bits of data may be modulated onto the subset of tones, and M may be greater than or equal to 2. In a second configuration, possible subsets may include D*(D−1)/2 two-tone subsets, D may be greater than 2, a number of bits of the data may be equal to k, and k may be a largest integer such that k is not greater than $\log_2(D*(D-1)*M*M/2)$. For example, referring to FIGS. 1 and 2, in a first configuration, the UE 104 determines to use BPSK to modulate 113 the data 210 onto a subset 206 of a tone 207 of the allocated set 202 of tones 208, the subset 206 of tones including one tone 207, the allocated set 202 of tones 208 includes 4 tones, the MPSK has 2 possible signal phases, and 3 bits of data are modulated onto the subset 206 of a tone 207. As another example, and referring to FIGS. 1 and 3, in a second configuration, the UE 104 determines to use QPSK to modulate 113 the data 310 onto a subset 306 of tones 307a, 307b of the set 302 of tones, possible subsets 308 include $D*(D-1)/2$ two-tone subsets, D is equal to 9, a number of bits of the data is equal to 9, which is the greatest integer not greater than $\log_2(D*(D-1)*M*M/2)$.

At 406, the data may be modulated onto the subset of tones based on a mapping that maps pairs of data values with a largest Hamming distance from each other to pairs of constellation points with a maximum Euclidean distance from each other. The mapping may map pairs of data values with a largest Hamming distance to constellation points that have data modulated to a same tone. The mapping may be between $2^k$ possible data values and $2^k$ constellation points of D*M constellation points, and k may be a largest integer such that D*M is greater than or equal to $2^k$. For example, referring to FIGS. 1-3, the UE 104 may modulate 113 the data 210, 310 onto the subset 206, 306 of tones 201, 301 based on a mapping that maps pairs of 8 possible data values (in FIG. 2) with a largest Hamming distance from each other to pairs of 8 constellation points of 4*2 constellation points with a maximum Euclidean distance from each other on a same tone.

At 408, the data is refrained from being modulated onto tones other than one tone in the set of tones. For example, referring to FIGS. 1 and 2, the UE 104 may refrain from modulating data onto tones (e.g., unselected tones 212) other than said one tone 207 in the allocated set 202 of tones.

Figure 5:
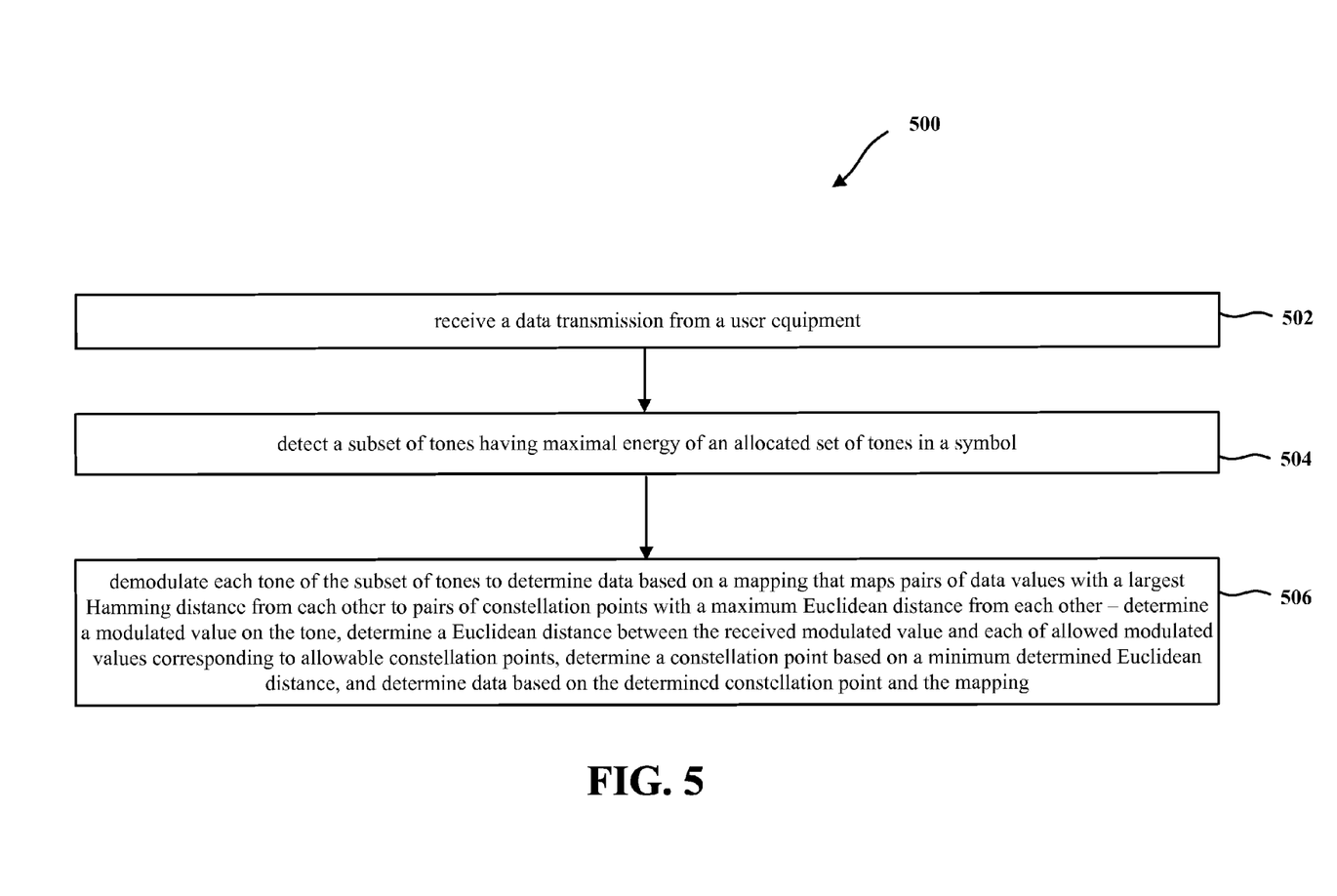
FIG. 5 is a flow chart of a method of wireless communication.

FIG. 5 is a flow chart 500 of a method of wireless communication. The method may be performed by a base station, such as the base station 102 shown in FIG. 1. At 502, a data transmission may be received from a UE. For example, referring to FIG. 1, the base station 102 may receive a signal 106 from a UE 104.

At 504, a subset of tones having maximal energy of an allocated set of tones in a symbol may be detected. The set of tones may include D tones, the MPSK may have M possible signal phases, and k bits of data may be modulated onto the subset of tones. Possible subsets may include $D*(D-1)/2$ two-tone subsets, D may be greater than 2, a number of bits of the data may be equal to k, and k may be a largest integer such that k is not greater than $\log_2(D*(D-1)*M*M/2)$. For example, referring to FIGS. 1-3, the base station 102 may detect 108 a subset 206, 306 of tones 207, 307a, 307b having maximal energy of an allocated set 202, 302 of tones in a symbol 204, 304, the set 202, 302 of tones including 4 tones in FIG. 2, or 9 tones in FIG. 3, the MPSK having 2 possible signal phases in FIG. 2, and 4 possible signal phases in FIG. 3, and 3 bits of data (FIG. 2) or 9 bits of data (FIG. 3) being modulated onto the subset 206, 306 of tones 207, 307a, 307b, the configuration shown in FIG. 3 including 36 two-tone subsets.

At 506, each tone of the subset of tones may be demodulated to determine data based on a mapping that maps pairs of data values with a largest Hamming distance from each other to pairs of constellation points with a maximum Euclidean distance from each other. The mapping may map pairs of data values with a largest Hamming distance to constellation points that have data modulated to a same tone. The mapping may be between $2^k$ possible data values and $2^k$ constellation points of D*M constellation points. Demodulating each tone may include determining a modulated value on the tone, determining a Euclidean distance between the received modulated value and each of allowed modulated values corresponding to allowable constellation points, determining a constellation point based on a minimum determined Euclidean distance, and determining data based on the determined constellation point and the mapping. For example, referring to FIGS. 1-3, the base station 102 may demodulate 109 each tone 207, 307a, 307b of the subset 206, 306 of tones to determine data 210, 310 based on a mapping that maps pairs of data values with a largest Hamming distance from each other to pairs of constellation points with a maximum Euclidean distance from each other and having data modulated to a same tone, and the demodulating 109 may be achieved by determining a modulated value 210, 310 on the tone 207, 307a, 307b, determining a Euclidean distance between the received modulated value and each of allowed modulated values corresponding to allowable constellation points, determining a constellation point based on a minimum determined Euclidean distance, and determining data based on the determined constellation point and the mapping.

Figure 6:
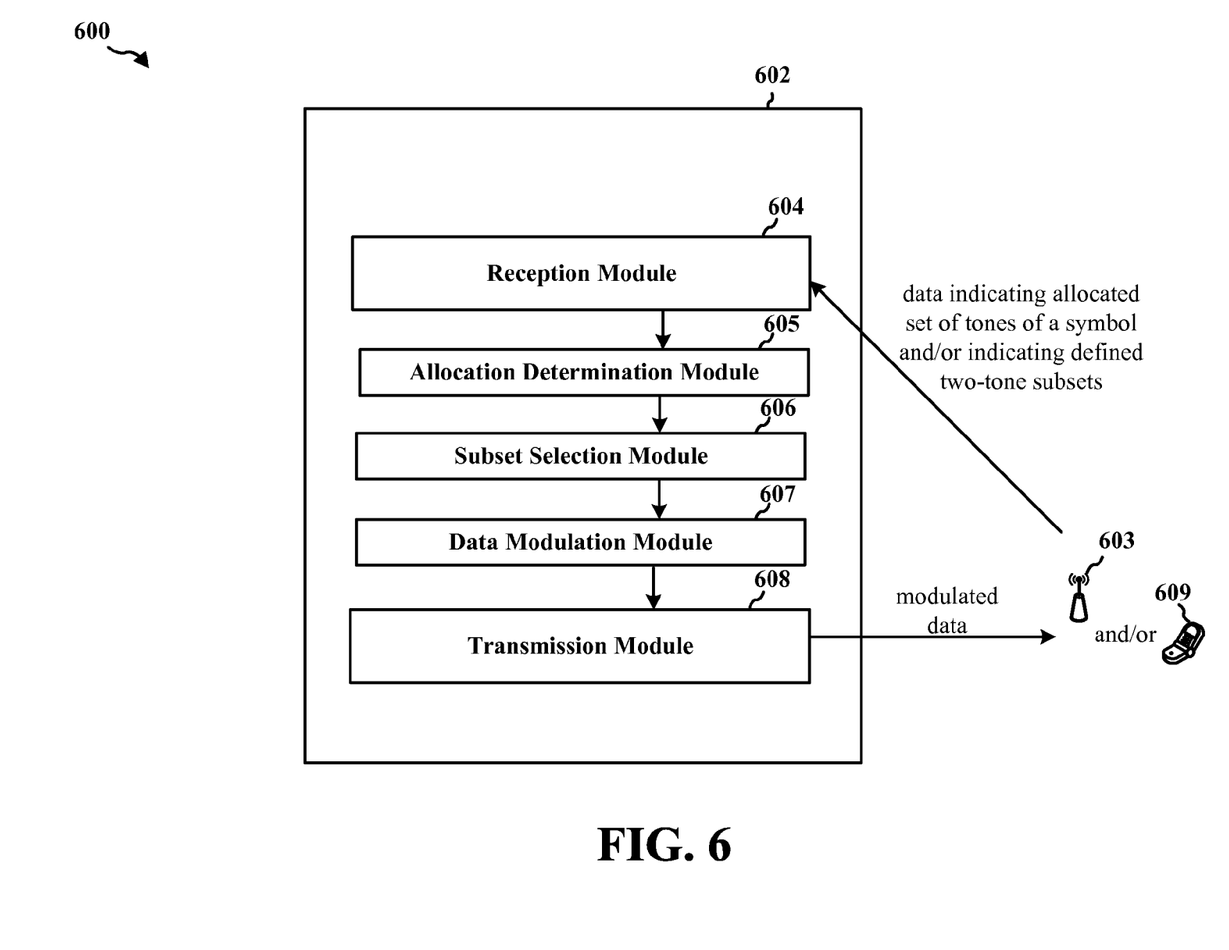
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus 602 may be a UE. The UE 602 includes a reception module 604 that is configured to receive data indicating an allocation of a set of tones in a symbol (e.g., a SC-FDMA symbol). The reception module 604 may also be configured to receive data indicating defined two-tone subsets, and/or to receive data indicating a data-value-to-constellation point mapping. The UE may receive the data from an eNB 603, from another UE 609, and/or from memory. The UE 609 may be operating as a relay. The UE 602 further includes an allocation determination module 605 that is configured to communicate with the reception module 604 and to determine which set of tones in a symbol have been allocated. The UE 602 further includes a subset selection module 606 that is configured to communicate with the allocation determination module 605 and to select a subset of tones of the allocated set of tones. The subset of tones may include one or more tones, and may be selected by the subset selection module 606 based on a mapping that maps pairs of data values with a largest Hamming distance from each other to pairs of constellation points with a maximum Euclidean distance from each other, such that the data can be conveyed via transmission. Although not shown, the subset selection module 606 may further have an input such that the subset selection module 606 may receive input bits of a data. The UE 602 further includes a data modulation module 607 that is configured to communicate with the subset selection module 606, to determine to use m-ary phase shift keying (MPSK) to modulate the data onto a selected subset of tones, and to modulate a modulated value(s) onto the tone(s) of the selected subset. The data modulation module 607 may be configured to modulate a modulated value(s) into the selected subset of the set of tones using MPSK (e.g., BPSK, QPSK, etc.). Furthermore, the data modulation module 607 may choose the signal phase of the modulated value(s) based on a mapping that maps pairs of data values with a largest Hamming distance from each other to pairs of constellation points with a maximum Euclidean distance from each other, such that the data can be conveyed via transmission. The UE further includes a transmission module 608 that communicates with the data modulation module 607. The transmission module 608 is configured to transmit the modulated data. The modulated data may be received by a node (the eNB 603). The data modulation module 607 may be configured to refrain from modulating data onto unselected tones of the allocated set of tones.

Figure 7:
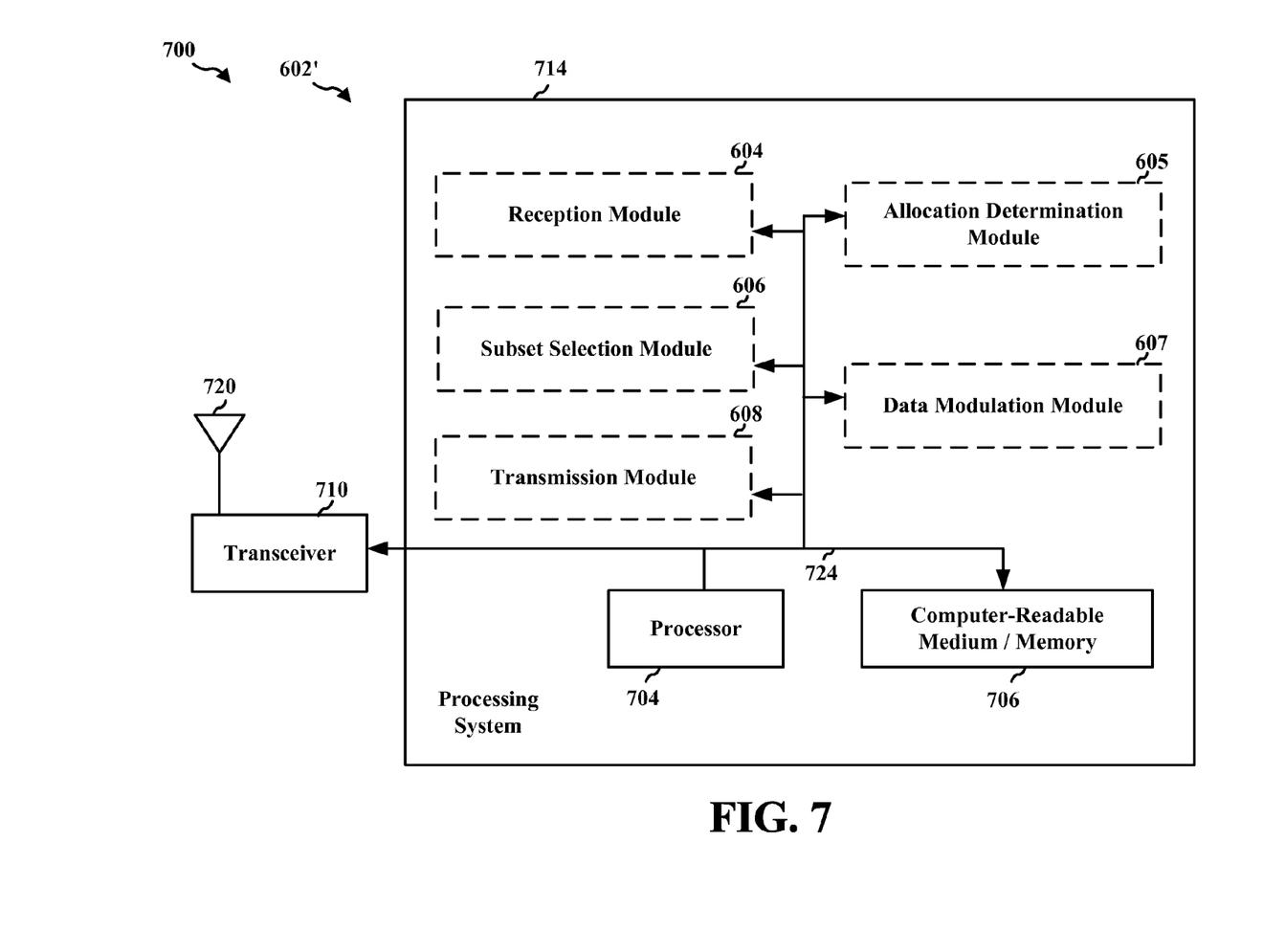
FIG. 7 is a diagram illustrating an example of a hardware implementation for an apparatus employing a processing system.

The apparatus may include additional modules that perform each of the blocks of the algorithm in the aforementioned flow chart of FIG. 4. As such, each block in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 7 is a diagram 700 illustrating an example of a hardware implementation for a UE 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 605, 606, 607, 608, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception module 604. In addition, the transceiver 710 receives information from the processing system 714, specifically the transmission module 608, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system further includes at least one of the modules 605, 606, 607. The modules may be software modules running in the processor 704, resident/stored in the computer readable medium/memory 706, one or more hardware modules coupled to the processor 704, or some combination thereof. The processing system 714 may be a component of the UE 602 and may include a memory and/or at least one TX processor, RX processor, and controller/processor.

In one configuration, the UE 602/602' for wireless communication is a UE that includes means for determining an allocation of a set of tones in a symbol for conveying data. The UE further includes means for determining to use m-ary phase shift keying (MPSK) to modulate the data onto a subset of tones of the set of tones. The UE further includes means for modulating the data onto the subset of tones based on a mapping that maps pairs of data values with a largest Hamming distance from each other to pairs of constellation points with a maximum Euclidean distance from each other. The UE may include means for refraining from modulating data onto tones other than said one tone in the set of tones. The aforementioned means may be one or more of the aforementioned modules of the UE 602 and/or the processing system 714 of the UE 602' configured to perform the functions recited by the aforementioned means. The processing system 714 may include a TX Processor, a RX Processor, and a controller/processor. As such, in one configuration, the aforementioned means may be a TX Processor, a RX Processor, and a controller/processor configured to perform the functions recited by the aforementioned means.

Figure 8:
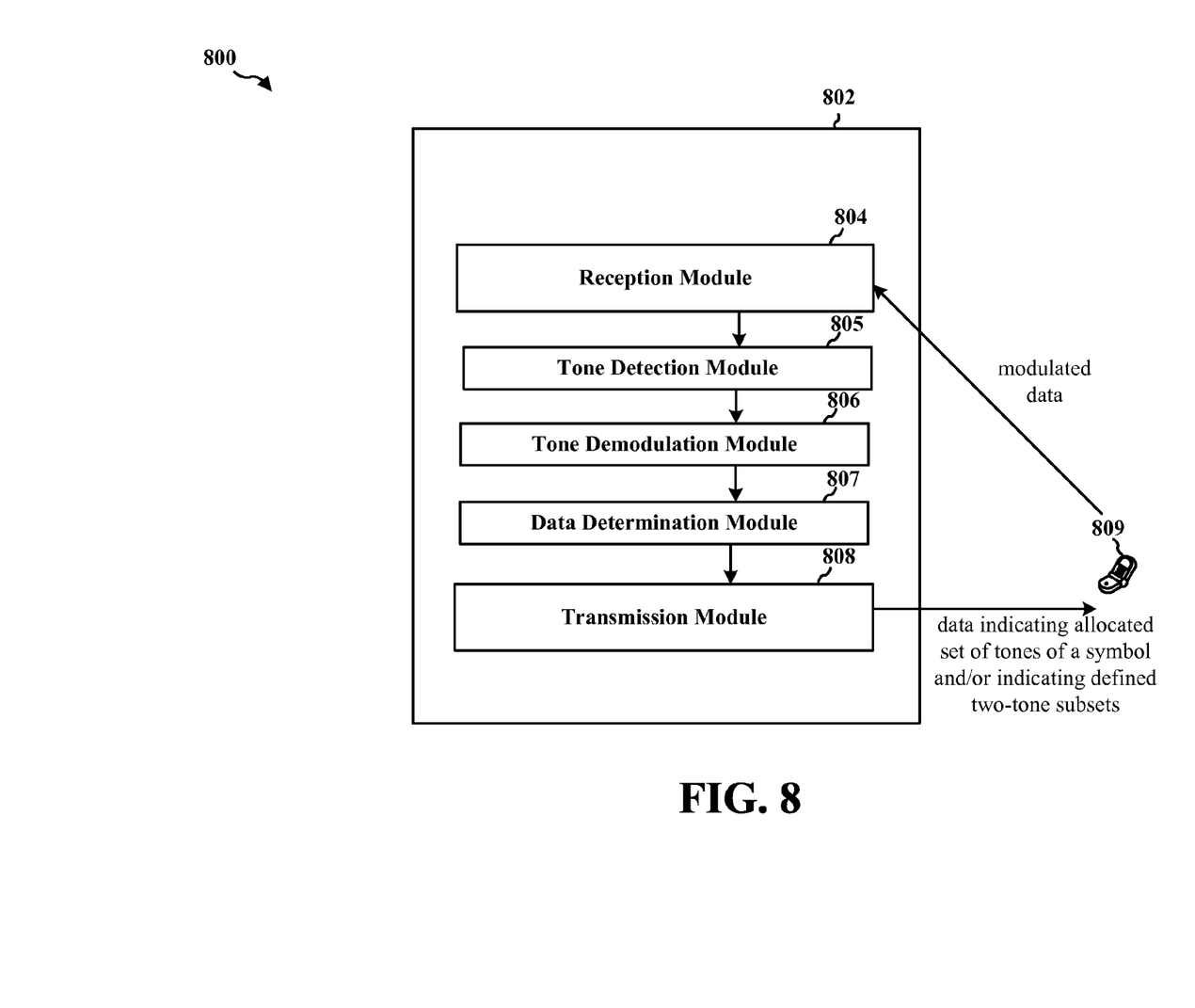
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be an eNB. The eNB 802 includes a reception module 804 that is configured to receive a data transmission, such as modulated data on a set of tones in a symbol (e.g., signal 106 including modulated data 210, 310 on a set 206, 306 of tones 207, 307a, 307b in a symbol 204, 304 from a UE 104, 602, 602', 809). The eNB 802 further includes a tone detection module 805 that is configured to communicate with the reception module 804, and that is configured to detect a subset of tones (e.g., tone 207, or tones 307a, 307b, having a nonzero entries) having maximal energy of an allocated set of tones in a symbol. The eNB 802 further includes a tone demodulation module 806 that is configured to communicate with the tone detection module 805 and that is configured to demodulate each tone of the subset of tones (e.g., tones 207, 307a, 307b). The eNB 802 further includes a data determination module 807 that is configured to communicate with the tone demodulation module 806 and that is configured to determine data based on a mapping that maps pairs of data values with a largest Hamming distance from each other (e.g., data values 111 and 000 in FIG. 2) to pairs of constellation points with a maximum Euclidean distance from each other. The determination module 807 may determine data by determining a modulated value on the tone, determining a Euclidean distance between the received modulated value and each of allowed modulated values corresponding to allowable constellation points, determining a constellation point based on a minimum determined Euclidean distance, and determining data based on the determined constellation point and the mapping. The eNB 802 further includes a transmission module 808 that is configured to communicate with the determination module 807. The transmission module 808 may be configured to communicate data to the UE 809 indicating an allocation of a set of tones in a symbol, data indicating defined two-tone subsets, and/or data indicating a data-value-to-constellation point mapping.

The apparatus may include additional modules that perform each of the blocks of the algorithm in the aforementioned flow chart of FIG. 5. As such, each block in the aforementioned flow charts of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
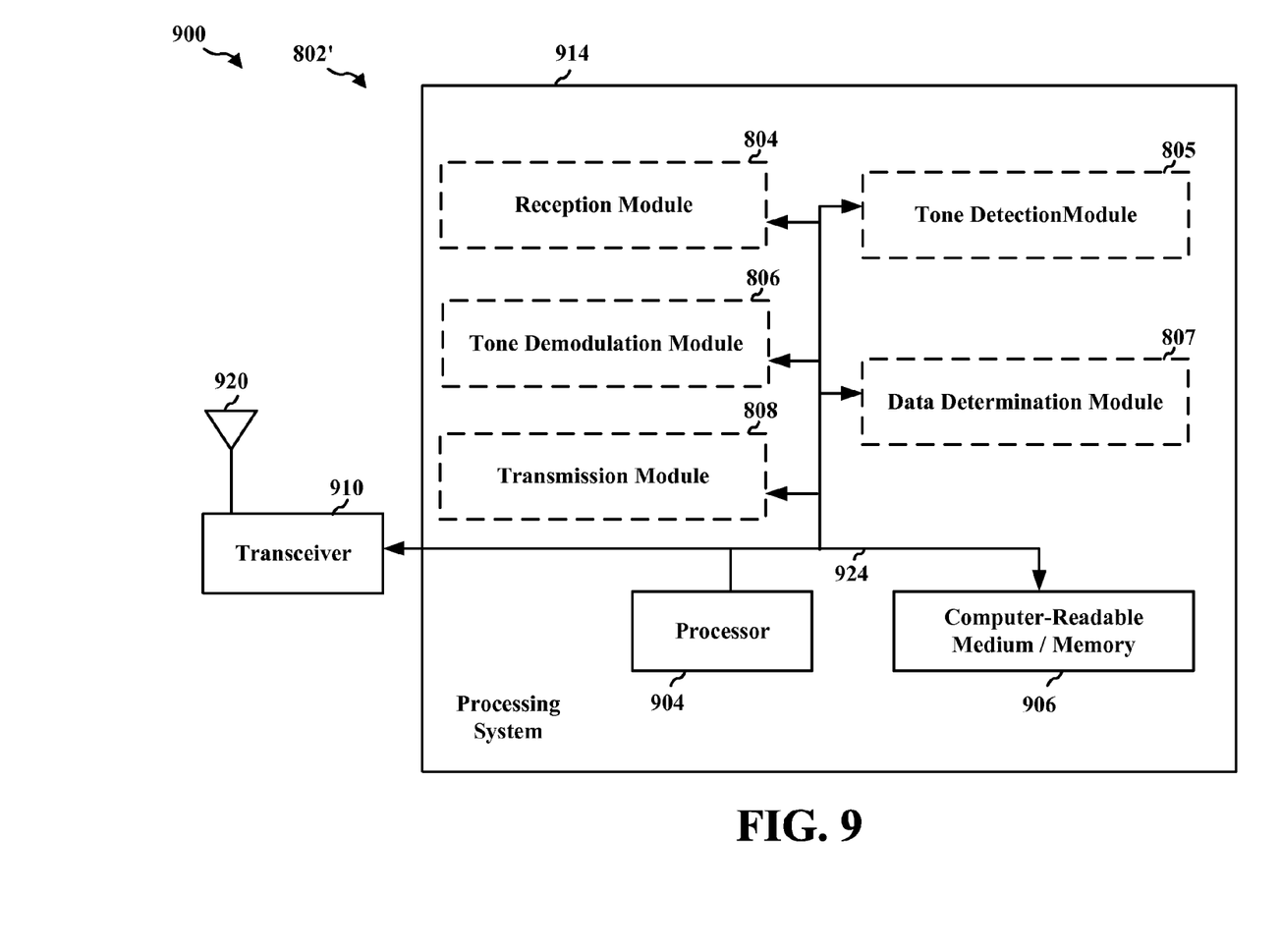
FIG. 9 is a diagram illustrating an example of a hardware implementation for an apparatus employing a processing system.

FIG. 9 is a diagram 900 illustrating an example of a hardware implementation for an eNB 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 805, 806, 807, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception module 804. In addition, the transceiver 910 receives information from the processing system 914, specifically the transmission module 808, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 805, 806, and 807. The modules may be software modules running in the processor 904, resident/stored in the computer readable medium/memory 906, one or more hardware modules coupled to the processor 904, or some combination thereof. The processing system 914 may be a component of the eNB 610 and may include the memory and/or at least one of the TX processor, the RX processor, and the controller/processor.

In one configuration, the eNB 802/802' includes means for means for receiving a data transmission from a user equipment (UE). The eNB further includes means for detecting a subset of tones having maximal energy of an allocated set of tones in a symbol. The eNB further includes means for demodulating each tone of the subset of tones to determine data based on a mapping that maps pairs of data values with a largest Hamming distance from each other to pairs of constellation points with a maximum Euclidean distance from each other. The aforementioned means may be one or more of the aforementioned modules of the eNB 802 and/or the processing system 914 of the eNB 802' configured to perform the functions recited by the aforementioned means. The processing system 914 may include a TX Processor, an RX Processor, and a controller/processor. As such, in one configuration, the aforementioned means may be the TX Processor, the RX Processor, and the controller/processor configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, by a user equipment (UE), an allocation of a set of tones in a symbol for conveying data;
   selecting, by the UE, a subset of tones from the set of tones based on values of bits of the data;
   determining, by the UE, to use m-ary phase shift keying (MPSK) to modulate the data onto the selected subset of tones of the set of tones; and
   modulating, by the UE, the data onto the selected subset of tones based on a mapping, tones in the set of tones other than the selected subset of tones being unmodulated by the UE, wherein the mapping maps pairs of data values with a largest Hamming distance from each other to pairs of constellation points with a maximum Euclidean distance from each other,
   wherein the set of tones includes D tones, the MPSK has M possible signal phases, k bits of data are modulated onto the selected subset of tones, and the mapping is between $2^k$ possible data values and $2^k$ constellation points of D*M constellation points, where D is a positive integer greater than 1, k is a positive non-zero integer and M is a non-zero real number.

2. The method of claim 1, wherein the mapping maps pairs of data values with a largest Hamming distance to constellation points that have data modulated to a same tone.

3. The method of claim 1, wherein the selected subset of tones comprises one tone, and the method further comprises refraining from modulating data onto tones other than said one tone in the set of tones.

4. The method of claim 1, wherein k is a largest integer that is smaller than or equal to $\log_2(M*D)$.

5. The method of claim 1, wherein M is greater than or equal to 2.

6. The method of claim 1, wherein the symbol is a single-carrier frequency division multiple access (SC-FDMA) symbol.

7. The method of claim 1, further comprising:
receiving, by a base station, a data transmission from the UE;
detecting, by the base station, a subset of tones having maximal energy of an allocated set of tones in a symbol; and
demodulating, by the base station, each tone of the subset of tones to determine data based on a mapping, wherein the mapping maps pairs of data values with a largest Hamming distance from each other to pairs of constellation points with a maximum Euclidean distance from each other.

8. A method of wireless communication, comprising:
determining, by a user equipment (UE), an allocation of a set of tones in a symbol for conveying data;
determining, by the UE, to use m-ary phase shift keying (MPSK) to modulate the data onto a subset of tones of the set of tones;
modulating, by the UE, the data onto the subset of tones based on a mapping, wherein the mapping maps pairs of data values with a largest Hamming distance from each other to pairs of constellation points with a maximum Euclidean distance from each other;
wherein the set of tones includes D tones, the MPSK has M possible signal phases, k bits of data are modulated onto the subset of tones, and the mapping is between $2^k$ possible data values and $2^k$ constellation points of D*M constellation points, where D is a positive integer, k is a positive non-zero integer and M is a non-zero real number; and
wherein possible subsets comprise $D*(D-1)/2$ two-tone subsets, D being greater than 2.

9. The method of claim 8, wherein a number of bits of the data is equal to k, and wherein k is a largest integer that is not greater than $\log_2(D*(D-1)*M*M/2)$.

10. The method of claim 8, wherein the mapping allows for $2^k$ distinct pairs of constellation points.

11. An apparatus for wireless communication, comprising:
means for determining an allocation of a set of tones in a symbol for conveying data;
means for selecting a subset of tones from the set of tones based on values of bits of the data;
means for determining to use m-ary phase shift keying (MPSK) to modulate the data onto the selected subset of tones of the set of tones; and
means for modulating the data onto the selected subset of tones based on a mapping, tones in the set of tones other than the selected subset of tones being unmodulated by the apparatus, wherein the mapping maps pairs of data values with a largest Hamming distance from each other to pairs of constellation points with a maximum Euclidean distance from each other,
wherein the set of tones includes D tones, the MPSK has M possible signal phases, k bits of data are modulated onto the selected subset of tones, and the mapping is between $2^k$ possible data values and $2^k$ constellation points of D*M constellation points, where D is a positive integer greater than 1, k is a positive non-zero integer and M is a non-zero real number.

12. The apparatus of claim 11, wherein the mapping maps pairs of data values with a largest Hamming distance to constellation points that have data modulated to a same tone.

13. The apparatus of claim 11, wherein the selected subset of tones comprises one tone, and the apparatus further comprises means for refraining from modulating data onto tones other than said one tone in the set of tones.

14. The apparatus of claim 11, wherein k is a largest integer that is smaller than or equal to log2(M*D).

15. The apparatus of claim 11, wherein M is greater than or equal to 2.

16. The apparatus of claim 11, wherein the symbol is a single-carrier frequency division multiple access (SC-FDMA) symbol.

17. An apparatus for wireless communication, comprising:
means for determining an allocation of a set of tones in a symbol for conveying data;
means for determining to use m-ary phase shift keying (MPSK) to modulate the data onto a subset of tones of the set of tones; and
means for modulating the data onto the subset of tones based on a mapping, wherein the mapping maps pairs of data values with a largest Hamming distance from each other to pairs of constellation points with a maximum Euclidean distance from each other;
wherein the set of tones includes D tones, the MPSK has M possible signal phases, k bits of data are modulated onto the subset of tones, and the mapping is between $2^k$ possible data values and $2^k$ constellation points of D*M constellation points, where D is a positive integer, k is a positive non-zero integer and M is a non-zero real number; and
wherein possible subsets comprise $D*(D-1)/2$ two-tone subsets, D being greater than 2.

18. The apparatus of claim 17, wherein a number of bits of the data is equal to k, and wherein k is a largest integer that is not greater than $\log_2(D*(D-1)*M*M/2)$.

19. The apparatus of claim 17, wherein the mapping allows for $2^k$ distinct pairs of constellation points.

20. A system comprising:
a user equipment (UE) having a memory and at least one processor coupled to the memory, the processor configured to:
determine an allocation of a set of tones in a symbol for conveying data;
select a subset of tones from the set of tones based on values of bits of the data;
determine to use m-ary phase shift keying (MPSK) to modulate the data onto the selected subset of tones of the set of tones; and
modulate the data onto the selected subset of tones based on a mapping, tones in the set of tones other than the selected subset of tones being unmodulated by the UE, wherein the mapping maps pairs of data values with a largest Hamming distance from each other to pairs of constellation points with a maximum Euclidean distance from each other.
wherein the set of tones includes D tones, the MPSK has M possible signal phases, k bits of data are modulated onto the selected subset of tones, and the mapping is between $2^k$ possible data values and $2^k$ constellation points of D*M constellation points, where D is a positive integer greater than 1, k is a positive non-zero integer and M is a non-zero real number; and
a base station having a memory and at least one processor coupled to the memory, the processor configured to:

receive a data transmission from the UE;
detect a subset of tones having maximal energy of an allocated set of tones in a symbol; and
demodulate each tone of the subset of tones to determine data based on the mapping, wherein the mapping maps pairs of data values with a largest Hamming distance from each other to pairs of constellation points with a maximum Euclidean distance from each other.

* * * * *